United States Patent
Tanaka et al.

(10) Patent No.: US 6,800,019 B2
(45) Date of Patent: Oct. 5, 2004

(54) ABRASIVE CLOTH AND POLISHING METHOD

(75) Inventors: Manabu Tanaka, Iwakuni (JP); Yoshiyuki Suzuki, Ooda (JP); Shusuke Kitawaki, Ooda (JP); Masahisa Mimura, Ooda (JP)

(73) Assignee: Teijin Limited, Osaka (JP)

( * ) Notice: Subject to any disclaimer, the term of this patent is extended or adjusted under 35 U.S.C. 154(b) by 114 days.

(21) Appl. No.: 10/182,647

(22) PCT Filed: Nov. 30, 2001

(86) PCT No.: PCT/JP01/10507

§ 371 (c)(1),
(2), (4) Date: Jul. 31, 2002

(87) PCT Pub. No.: WO02/45906

PCT Pub. Date: Jun. 13, 2002

(65) Prior Publication Data

US 2003/0013382 A1 Jan. 16, 2003

(30) Foreign Application Priority Data

Dec. 5, 2000 (JP) ........................................ 2000-369738

(51) Int. Cl.⁷ ........................... B24B 1/00; B24D 11/00; D04H 1/00
(52) U.S. Cl. .............................. 451/36; 51/298; 51/307; 428/903; 442/351; 442/366; 442/405; 451/37; 451/41; 451/59; 451/63; 451/532; 451/550
(58) Field of Search .......................... 51/295, 298, 300, 51/307; 428/903, 932; 442/340, 351, 366, 400, 401, 402, 405; 451/36, 37, 41, 42, 59, 63, 526, 532, 550

(56) References Cited

U.S. PATENT DOCUMENTS

| | | | | |
|---|---|---|---|---|
| 4,478,610 A | * | 10/1984 | Parekh et al. | 51/298 |
| 5,877,098 A | | 3/1999 | Tanaka et al. | |
| 5,989,113 A | * | 11/1999 | Arnold | 451/532 |
| 6,302,930 B1 | * | 10/2001 | Lux | 51/298 |
| 6,595,843 B1 | * | 7/2003 | Weber | 451/532 |

FOREIGN PATENT DOCUMENTS

| | | |
|---|---|---|
| JP | 6-257016 | 9/1994 |
| JP | 9-277175 | 10/1997 |
| JP | 11-138407 | 5/1999 |
| JP | 11-203667 | 7/1999 |
| JP | 2000-237951 | 9/2000 |

* cited by examiner

Primary Examiner—Timothy V. Eley
(74) Attorney, Agent, or Firm—Sughrue Mion, PLLC

(57) ABSTRACT

An abrasive ground fabric which is a composite ground fabric comprising a fiber substrate and a elastic polymer filled in the fiber substrate, wherein (1) the fiber substrate is composed of bundles, each consisting of 20 to 3,000 fine fibers, and (2) the average diameter (D1) of fine fibers existent in a center portion from the center of the cross section perpendicular to a lengthwise direction of each bundle to ½ of the radius of each bundle is 0.3 to 10 μm, the average diameter (D2) of fine fibers existent in a peripheral portion from ½ of the radius to the end of each bundle is 0.05 to 1 μm, and the D1/D2 ratio is 1.5 or more. According to the present invention, the abrasive ground fabric is suitably used for the texturing of a substrate in the production of a magnetic recording medium, particularly a hard disk, enables high-accuracy surface finish and has excellent strength.

18 Claims, No Drawings

ABRASIVE CLOTH AND POLISHING METHOD

DETAILED DESCRIPTION OF THE INVENTION

1. Field of the Invention

The present invention relates to an abrasive ground fabric used for the production of magnetic recording media and similar media which require high-accuracy surface finish. Specifically, it relates to an abrasive ground fabric suitably used for texturing in the production of magnetic recording substrates such as hard disks and to a polishing method using the same.

2. Description of the Prior Art

Along with recent progress made in information processing technologies such as computers, high-accuracy surface finish is required for magnetic recording media and silicon wafers. For example, to produce a magnetic recording substrate such as a hard disk as a magnetic recording medium, the surface of aluminum or glass is smoothened and plated with a non-magnetic material such as nickel-P, a magnetic thin film of a cobalt-based alloy is formed on the surface, and then a surface protective layer such as a carbon layer is formed on the film. The requirement for an abrasive ground fabric used to smooth the above surface is becoming higher and higher. Particularly in the final stage of smoothing the surface of this magnetic recording substrate, a surface treatment called "texturing" using a slurry containing abrasive grains dispersed therein and an abrasive ground fabric is carried out to form fine grooves in the surface of the disk and the development of the optimum abrasive ground fabric for increasing the capacity and density of the disk has been awaited from the market.

As the abrasive ground fabric used for texturing has been used a fabric woven of fine fibers of about 5 µm in diameter or a sheet transplanted with fibers of 14 µm in diameter. However, the above fabric has problems that polishing with fine fibers of 5 µm in diameter is unsatisfactory and the freedom of fibers is low, and the above sheet has problems that the surface of the substrate is easily scratched deeply and a magnetic recording medium having low reliability is obtained because thick fibers are transplanted perpendicular to the surface.

To solve the above problems, JP-A 9-277175 (the term "JP-A" as used herein means an "unexamined published Japanese Patent Application") proposes an abrasive sheet which is a nonwoven fabric composed of intertwined fine fibers of 10 µm or less in diameter and having a raised surface. However, a nonwoven fabric obtained by a melt blow method has a problem that the strength of fibers is low and a nonwoven fabric composed of ordinary split fibers has a problem that fine fibers readily fall off because they are physically intertwined. In general texturing, the nonwoven fabric is used in the form of a tape. In this method, a reinforcing layer must be laminated as the strength of the tape is unsatisfactory. JP-A 11-138407 proposes abrasive cloth produced by cutting part of a bundle of a fabric and raising it. However, it is difficult to produce the abrasive cloth on an industrial scale because part of the bundle of the obtained fabric must be cut and fine fibers of less than 2 µm in diameter must be raised.

Further, JP-A 2000-237951 proposes abrasive cloth which is a nonwoven fabric comprising fine fibers of 0.3 dtex or less and having a hydrophilic surface. This abrasive cloth is a nonwoven fabric composed of fiber bundles, each consisting of 30 or less fine fibers which are polyethylene terephthalate fibers and relatively uniform in diameter from the viewpoint of a production method thereof. It is difficult to maintain both the strength and polishing accuracy of the abrasive ground fabric at high levels as the number of fine fibers constituting each bundle is relatively small and the fibers are uniform in diameter.

PROBLEM TO BE SOLVED BY THE INVENTION

It is an object of the present invention which has been made to solve the above problems to provide an abrasive ground fabric which is capable of polishing uniformly without producing a deep scratch in the surface of a substrate by variations in polishing conditions when the surface of a magnetic recording medium or the like is subjected to precision polishing such as texturing and has sufficiently high strength and a method of polishing a magnetic recording substrate using the same.

MEANS FOR SOLVING THE PROBLEMS

According to researches conducted by the inventors of the present invention, it has been found that the object of the present invention is attained by an abrasive ground fabric which is a composite ground fabric comprising a fiber substrate and a elastic polymer filled in the fiber substrate, wherein (1) the fiber substrate is composed of fiber bundles, each consisting of 20 to 3,000 fine fibers, and (2) the average diameter (D1) of fine fibers existent in a center portion from the center of the cross section perpendicular to a lengthwise direction of each fiber bundle to ½ of the radius of each fiber bundle is 0.3 to 10 µm, the average diameter (D2) of fine fibers existent in a peripheral portion from ½ of the radius to the end of each fiber bundle is 0.05 to 1 µm, and the D1/D2 ratio is 1.5 or more. Further, it has been found that the object of the present invention is attained by an abrasive ground fabric which has (a) a water absorption height on one side of 20 mm/hr or more and a water absorption height on the other side of 5 mm/hr or less, and (b) one raised side.

The abrasive ground fabric of the present invention will be described in more detail hereinbelow.

The abrasive ground fabric of the present invention is a composite ground fabric which comprises a fiber substrate and a elastic polymer filled in the fiber substrate. This fiber substrate is composed of fiber bundles of fine fibers and the elastic polymer is mainly existent outside the fiber bundles in the inside of the fiber substrate other than the surface layer of the fiber substrate. That is, the elastic polymer is substantially existent in spaces between the fiber bundles. Each fiber bundle consists of 20 to 3,000 fine fibers, preferably 50 to 2,000 fine fibers, the most preferably 100 to 1,600 fine fibers. When the number of fine fibers is smaller than 20, the number of fibers in the peripheral portion becomes small and the effect obtained by the difference in average diameter between the center portion and the peripheral portion which will be described hereinafter is hardly obtained. From the viewpoint of production, the total fineness of the fine fibers of each bundle is preferably 1 to 10 dtex, more preferably 2 to 5 dtex.

As for the fine fibers of each bundle, the average diameter (D1) of fine fibers existent in the center portion from the center of the cross section perpendicular to the lengthwise direction of the bundle to ½ of the radius of the bundle must be 0.3 to 10 µm (about 0.0008 to about 0.94 dtex), preferably 0.5 to 2 µm (about 0.0024 to about 0.038 dtex). When the average diameter (D1) of the fine fibers of the center portion is smaller than 0.3 μm, the strength of the fine fibers lowers and the strength of the obtained composite ground fabric also lowers. When the average diameter (D1) is larger than 10 μm, a substrate to be polished is easily scratched by polishing.

The average diameter (D2) of fine fibers existent in the peripheral portion must be 0.05 to 1 μm (about 0.00002 to about 0.0094 dtex), more preferably 0.1 to 0.7 μm (about 0.0001 to about 0.0046 dtex), the most preferably 0.2 to 0.5 μm (about 0.00038 to about 0.0024 dtex). When the average diameter (D2) is smaller than 0.05 μm, the strength of fine fibers lowers and the fine fibers fall off at the time of polishing. When the average diameter (D2) is larger than 1 μm, there is no difference between the conventional product and the obtained product of the present invention.

Further, the largest diameter of a fine fiber of each bundle is preferably 10 μm (about 0.94 dtex) or less, more preferably 3 μm (about 0.1 dtex) or less. The smallest diameter of a fine fiber is preferably 0.01 μm (about 0.000001 dtex) or more. When the diameter of the fine fiber is larger than 10 μm, a substrate to be polished is readily scratched by polishing.

Since the numerical values within the parentheses (unit: dtex) differ by density, when the fine fibers are made from nylon 6, the calculated numerical values are given for reference.

The average diameter (D1) of the fine fibers existent in the center portion of each staple must be 1.5 times or more the average diameter (D2) of the fine fibers existent in the peripheral portion. Further, (D1) is preferably 2.0 to 6 times (D2), the most preferably 3.0 to 5 times (D2). In the present invention, the abrasive ground fabric obtains strength and precision polishing property at the same time when the above requirement is satisfied.

As for the diameter of each fine fiber, a electron microphotograph of the section of the ground fabric is taken to measure the diameter of the section of each fine fiber from the electron microphotograph. That is, fine fibers existent in the area (center portion) from the center point of the longest diameter of one bundle of the section to ½ of the distance from this center to the outermost end are defined as the fibers of the center portion and fine fibers existent in the area from ½ of the distance to the outermost layer observable are defined as the fibers of the peripheral portion.

The method of producing fine fibers constituting the fiber substrate is not particularly limited. Specifically, fibers are formed by a known spinning method using two or more different fiber forming polymers which differ from each other in solvent solubility and then one component is extracted and removed. Preferably, required strength can be provided to the fibers by drawing after spinning. To obtain a bundle which is the most suitable for the object of the present invention, a mixed spinning method which is described, for example, in JP-A 6-257016 is preferred. A polyamide such as nylon 6, nylon 6,6 or nylon 12, or a polyester such as polyethylene terephthalate or polybutylene terephthalate may be used as a fiber forming polymer (island component) constituting a fine fiber component, and low-density polyethylene, polypropylene or polystyrene may be used as a polymer (sea component) which differs from the above polymers in solvent solubility. Out of these, a combination of nylon 6 and polyethylene is preferred because fine fibers can be easily produced on an industrial scale. Particularly when a polyamide fiber such as a nylon fiber is used, it has a lower modulus than a polyester fiber and is hardly scratched by polishing.

In order to obtain a bundle having a large D1/D2 ratio, it is preferred to reduce the melt flow index (increase the viscosity) of a polymer as a sea component at a spinning temperature or increase the difference of melt flow index between the sea component and the island component. It is also advantageous to add polyethylene glycol in an amount of 0.2 to 3 wt %, preferably 0.5 to 2 wt %.

The fiber substrate of the present invention is a nonwoven fabric, fabric or knitted product composed of bundles of the above fine fibers, the most preferably a nonwoven fabric from the viewpoint of the object of the present invention. The method of forming the nonwoven fabric may be a known method and is not particularly limited. However, the fiber substrate of the present invention is preferably a needle punched nonwoven fabric produced by using a card, cross-layer or needle rocker, or an intertwined nonwoven fabric produced by using a fluid.

To reinforce the fiber substrate, the elastic polymer is filled in spaces between bundles. The 100% elongation modulus of the used elastic polymer is preferably 9 to 40 MPa. Examples of the elastic polymer include polyurethane resin, polyurethane.polyurea resin, polyacrylic acid resin, polystyrene.butadiene resin and polyacrylonitrile.butadiene resin. Out of these, polyurethane resin is preferred from the viewpoints of processability, abrasion resistance and hydrolytic resistance.

The polyurethane resin is obtained by reacting a polyol alone such as polyether diol, polyester diol or polycarbonate diol having a molecular weight of 500 to 4,000 or a mixture thereof with an organic diisocyanate and a low molecular chain extender having a molecular weight of 500 or less. When a slurry containing abrasion grains is alkaline or acidic and causes the hydrolytic deterioration of the polyurethane resin, it is recommended to use an ether-based or carbonate-based polyurethane.

The weight ratio of the elastic polymer/the fiber substrate is preferably 10/90 to 60/40, more preferably 25/75 to 50/50. When the ratio of the elastic polymer is smaller than 10%, it has no reinforcing effect and has poor dimensional stability at the time of processing. When the ratio of the elastic polymer is larger than 60%, the adhesion of the abrasive grains may be poor and the removability of chips produced by polishing may deteriorate. In order to fill the elastic polymer, the fiber substrate is impregnated and/or coated with an organic solvent solution or aqueous dispersion of the elastic polymer and then the solution or dispersion is solidified in a wet manner or dry manner to adhere the elastic polymer to the substrate. The elastic polymer must be uniformly adhered in such a manner that it substantially fills spaces between fiber bundles in the fiber substrate and it is preferred that the elastic polymer be coagulated in a porous form so as to hold abrasive grains and polish the surface without producing a defect such as a scratch. Wet coagulation is the most preferred for this purpose. As the organic solvent for the elastic polymer may be used polar solvents such as dimethyl formamide, dimethyl acetamide and dimethyl sulfoxide, toluene, acetone and methyl ethyl ketone.

The elastic polymer is preferably filled in spaces between bundles in the fiber substrate and also in the fiber bundles of fine fibers on the surface in small quantities because this can prevent fine fibers from falling off and can suppress the production of chips by polishing. To this end, after the elastic polymer is filled, a small amount of the solution of the above solvent and the elastic polymer may be applied to the surface by such means as gravure. A raised product prepared by raising the polished surface in accordance with a method known per se is preferred because it rarely damages an article to be polished.

The abrasive ground fabric is preferably uniform in thickness in the longitudinal direction and the transverse direction. The thickness of the abrasive ground fabric is preferably 0.3 to 1.2 mm. When the thickness is smaller than 0.3 mm, the strength of the fabric tends to be unsatisfactory and when the thickness is larger than 1.2 mm, work efficiency tends to lower. As for thickness accuracy, the standard deviation of thickness (CV value) measured in the longitudinal direction is preferably 3 or less, more preferably 2 or less, whereby the surface smoothness of a disk to be polished is apt to be improved. It is recommended to slice the obtained ground fabric in order to optimize its thickness or improve its productivity. It is advantageous that the abrasive ground fabric have a tape form having a width of 5 to 300 mm, preferably 7 to 200 mm.

The preferred tensile strength of the abrasive ground fabric of the present invention is 10 N/cm or more, more preferably 25 to 200 N/cm, the most preferably 50 to 180 N/cm. As the tensile strength increases, the reduction in width becomes smaller and processing becomes more uniform without surface roughness.

When the abrasive ground fabric is processed into a tape form as in the case of texturing before use, its dimensional change at the time of processing is preferably small. It is desired that the reduction in the width of the tape measured by a method to be described hereinafter be 20% or less, preferably 15% or less, the most preferably 6% or less. The proportion of the reduction in width is expressed by the percentage of the length of a reduction in width under a load of 5 N/cm to the length of the width of the tape under no load.

Further, the surface of the abrasive ground fabric is preferably hydrophilic so that the slurry containing the abrasive grains is absorbed into the abrasive ground fabric at a suitable rate when it is supplied between a material to be polished such as a hard disk and the abrasive ground fabric. That is, the hydrophilic nature of the polishing surface of the abrasive ground fabric is such that its water absorption rate measured under conditions to be described hereinafter is 80 sec or less, preferably 1 to 60 sec, more preferably 20 to 50 sec.

In order to provide water absorptivity to the abrasive ground fabric to ensure that the water absorption rate becomes the above value, it is effective that the abrasive ground fabric be treated with an anionic or nonionic penetrant. Examples of the anionic penetrant include dioctylsulfosuccinate.sodium salt, dodecyldiphenylether disulfonic acid.sodium salt, dodecylbenzenesulfonic acid.sodium salt and naphthalenesulfonic acid.sodium salt, and examples of the nonionic penetrant include secondary lauryl alcohol.ethoxylate, dodecyl alcohol adduct with ethylene oxide and ethylene oxide added alkyl phenyl ether. The amount of the penetrant which differs by type is about 0.01 to 3 wt % based on the ground fabric.

To provide hydrophilic nature to the abrasive ground fabric, the abrasive ground fabric is immersed in an aqueous solution of the penetrant, or an aqueous solution of the penetrant is applied to the surface of the abrasive ground fabric by such means as a spray or gravure roller.

Hydrophilic nature can be provided to the entire surface of the abrasive ground fabric by immersing it in the aqueous solution of the penetrant. However, in this case, the slurry containing the abrasive grains is impregnated into the inside of the abrasive ground fabric and wasted more than required for polishing. The reduction in the consumption of the expensive abrasive slurry is desired to reduce polishing cost.

Thus, the abrasive ground fabric of the present invention can have a composite structure that it has a hydrophilic layer on the polishing surface and the inside of the fabric is hydrophobic (including the rear side). When the abrasive ground fabric having this composite structure is used, the consumption of the slurry containing abrasive grains can be reduced and a base material to be polished can be polished uniformly at a high productivity.

The abrasive ground fabric having a composite structure consisting of a hydrophilic layer and a hydrophobic layer can be obtained by various methods. For example, the abrasive ground fabric is immersed in a liquid containing a water repellant or sprayed with a liquid containing a water repellant to obtain a water repellant abrasive ground fabric, and then the surface of the abrasive ground fabric is coated with a liquid of a hydrophilic penetrant by a spray or gravure rolling method to obtain an abrasive ground fabric whose surface is hydrophilic and whose interior (surface) is hydrophobic.

The penetrant for providing hydrophilic nature may be anionic or nonionic. The water repellant for providing water repellency is a fluorine-based water repellant or wax-based water repellant.

The degree of hydrophilic nature and the degree of hydrophobic nature of the above abrasive ground fabric having a hydrophilic side and a hydrophobic side can be expressed by water absorption heights on the both sides. That is, when the abrasive ground fabric is held vertically so that one end thereof is immersed in water in the method and conditions to be described hereinafter, it is advantageous that the water absorption height on the hydrophilic side be 20 mm/hour or more, preferably 40 to 90 mm/hour and the water absorption height on the hydrophobic side be 5 mm/hour or less, preferably 0 to 2 mm/hour. Further, the water absorption height on the hydrophilic side after 10 minutes is preferably 10 to 60 mm, more preferably 20 to 50 mm. Even when the abrasive slurry is injected at the time of polishing, as the abrasive ground fabric does not absorb a large amount of the slurry at a time, the abrasive slurry can be used effectively and efficiently.

The abrasive ground fabric of the present invention preferably has a hydrophilic layer on the polishing side and the thickness of the hydrophilic layer is 500 μm or less, preferably 400 μm or less, the most preferably 350 μm or less. The lower limit of the thickness is 100 μm from a practical point of view.

Preferably, the surface of the polishing side of the abrasive ground fabric of the present invention is raised. By polishing with a raised surface, the effect of forming uniform and concentric grooves in a base material to be polished is obtained more easily, thereby reducing the number of abnormal scratches. The surface of the polishing side may be raised by a method known per se.

To obtain an abrasive ground fabric having a raised surface, a composite ground fabric obtained by filling a elastic polymer into a fiber substrate may be raised. It is desired that the composite ground fabric be treated with an organic silicone compound to enhance a fiber raising effect. This organic silicone compound may be what is generally used to improve the slipperiness of fibers so as to raise a fibrous ground fabric.

Researches conducted by the inventors of the present invention have revealed that when a fibrous ground fabric is raised using an organic silicone compound, the organic silicone compound remains in the ground fabric and the remaining organic silicone compound falls off at the time of polishing and is adhered to the surface of a magnetic recording medium to be polished and that when this adhered organic silicone compound forms a magnetic layer on the surface of the medium, the magnetic layer peels off at the adhered portion.

To suppress a trouble caused by the organic silicone compound falling off from the abrasive ground fabric, it is preferred that the organic silicone compound contained in the abrasive ground fabric be completely removed by washing and the content of the organic silicone compound in the terms of silicon atoms be 300 ppm or less, preferably 200 ppm or less based on the abrasive ground fabric.

It has been found that to reduce the content of the organic silicone compound to the above range, the abrasive ground fabric is preferably washed in an aqueous solution containing 0.5 to 10 g/liter, preferably 1 to 7 g/liter of polyoxyethylene alkyl ether after raising. The polyoxyethylene alkyl ether is preferably such that the number of recurring units in the oxyethylene chain is 2 to 25 and the alkyl group has 4 to 25 carbon atoms.

A description is subsequently given of the method of polishing a magnetic recording substrate with the abrasive ground fabric of the present invention based on texturing for the production of a hard disk. This method is carried out using the abrasive ground fabric of the present invention and a slurry containing abrasive grains dispersed therein. Normal texturing conditions can be used for this purpose. For example, the abrasive grain concentration of the slurry containing abrasive grains dispersed therein is 0.1 to 1 wt %, the supply of the abrasive slurry solution is 4 to 15 ml/min, the revolution speed of the disk is 100 to 500 rpm, the supply of the abrasive ground fabric is 1 to 10 ml/sec, the pressure of the cylinder is 49 to 294 kPa and the polishing time is 5 to 30 sec.

Preferably, the slurry containing abrasive grains dispersed therein and the abrasive ground fabric are ionically the same, or any one of them is nonionic. For instance, when one of them is anionic and the other is cationic, the separation of the slurry occurs on the surface of the abrasive ground fabric, thereby impairing texturing stability.

The abrasive grains to be used with the abrasive ground fabric are selected from the group consisting of aluminum oxide, silicon dioxide, cerium oxide, zirconium oxide, silicon nitride or mono- or poly-crystal diamond and have a diameter of 0.05 to 0.5 μm, In a hard disk obtained by texturing using an abrasive ground fabric having a composite structure that the polishing surface has a hydrophilic layer and the interior is hydrophobic, the distance (Rp) from the average value of its surface roughness to a mountain portion is smaller than the distance (Rv) from the average value to a valley portion and the density of recorded data can be increased. Stated more specifically, the distance from the highest peak portion to the average value is designated as Rp and the distance from the lowest valley portion to the average value is designated as Rv, the Rv/Rp of the obtained hard disk is preferably more than 1.5, more preferably more than 3.0.

FUNCTION OF THE INVENTION

The abrasive ground fabric of the present invention comprises a fiber substrate and a polymer elastic material and is reinforced by a polymer to prevent fibers from falling off. The fibers constituting the fiber substrate form fiber bundles of fine fibers and the average diameter (d1) of the fine fibers of the center portion of each bundle is 1.5 times or more the average diameter (d2) of the fine fibers of the peripheral portion. In the present invention, the abrasive ground fabric obtains both strength and precision polishing property from this relationship. If the fine fibers of the center portion are the same in diameter as the fine fibers of the peripheral portion, the strength of the abrasive ground fabric cannot be maintained. Particularly when the abrasive ground fabric is used in the form of a tape as in the case of texturing a hard disk, if the width of the abrasive ground fabric is reduced by tension at the time of processing, the surface is roughened, thereby making impossible uniform processing. In the fiber bundle constituting the fiber substrate of the abrasive ground fabric of the present invention, as the diameters of the fine fibers of the center portion are large, the strength of the bundles is not reduced and as the diameters of the fine fibers of the peripheral portion are small, the adhesion of the fine abrasive grains to the abrasive ground fabric is improved, thereby enhancing the effect of removing fine dust which is the cause of noise, such as chips produced by polishing.

EXAMPLES

The following examples are provided for the purpose of further illustrating the present invention but are in no way to be taken as limiting. Percentages and ratios mean wt % and weight ratios, respectively, unless otherwise stated in Examples. The measurement values in Examples are obtained by the following methods.

(1) Average Diameter of Fine Fibers

The diameter of the section of a fine fiber is obtained by the method described below.

The prepared abrasive ground fabric is first used as a test sample, immersed in water to be fully degasified and impregnated with water and cut with a sharp knife while it is frozen at −20° C. using the RM-S microtome equipped with the EF-10 electronic sample cooling unit of Nippon Microtome Kenkyusho Co., Ltd. The sample is then thawed at room temperature, held such that its cut surface is not moved and dried at 120° C. for 30 minutes. Thereafter, gold is deposited on the test sample by the JFC-1500 ion sputtering device of Nippon Denshi Datum Co., Ltd., five bundles which are cut at a right angle with respect to the surface of the abrasive ground fabric and have a circular or oval cross section are selected by observing through the JSM-6100 scanning electron microscope, and the cut cross sections of the bundles are photomicrographed at a magnification of ×4,000. The photomicrographs are used to measure the diameters of the sections of the fine fibers of the fiber bundles.

Fine fibers existent in the area from the center point of the longest diameter of each fiber bundle on the cut section to ½ of the distance from the center to the outermost end of each fiber bundle are defined as the fine fibers of the center portion and fine fibers existent in the outermost layer which can be observed from the side are defined as the fine fibers of the peripheral portion. When the number of fine fibers is small, the diameters of all of the fine fibers are measured, and when the number of fine fibers is large, the diameters of 20 fine fibers of the center portion selected at random and 50 fine fibers of the peripheral portion are measured to calculate the average diameters of one fiber bundle. Further, the average values of the five fiber bundles are finally calculated to obtain the average diameter d1 of the fine fibers of the center portions and the average diameter d2 of the fine fibers of the peripheral portions of the bundles used in the abrasive ground fabric.

(2) 100% Elongation Modulus

The 100% elongation modulus of the elastic polymer is measured by the Shimadzu Autograph AGS-500G of Shimadzu Corporation at a pull rate of 50 mm/min by cutting the test sample in accordance with JIS-K6550 and stress at the time of 100% elongation is taken as 100% elongation modulus.

(3) Thickness and Variations in Thickness (CV Value)

The thickness in the longitudinal direction of the abrasive ground fabric is measured at 500 random points, the average value of thickness and standard deviation are obtained from the data, and the standard deviation value (CV value) is obtained from the following equation.

CV value (%)=(standard deviation/average value)×100

The thickness is measured by a thickness gauge which can read up to 1/100 under a load of 11.8 kPa.

(4) Tensile Strength

The tensile strength of the test sample is measured by the Shimadzu Autograph AGS-500G of Shimadzu Corporation at a pull rate of 50 m/min by cutting the test sample in accordance with JIS-K6550.

(5) Width Reduction Rate

The test sample is cut to a width of 40 mm (in a transverse direction) and a length of 150 mm (in a longitudinal direction) and the width of the obtained test sample is measured by the Shimadzu Autograph AGS-500G of Shimadzu Corporation at a pull rate of 50 mm/min until a load of 20 N (5 N/cm) is applied to obtain a width reduction rate (%).

(6) Measurement of Water Absorption Speed and Thickness of Hydrophilic Layer on the Surface The abrasive ground fabric is left in a desiccator at a temperature of 20° C. and a humidity of 60% for 12 hours or more to prepare a test sample. 15 μl of water is dropped on the test sample placed on a flat surface from a height of 2 cm above the test sample by a micropipette in a chamber maintained at a temperature of 20° C. and a humidity of 60%. The time interval from the time when the water is dropped to the time when the water is completely absorbed into the ground fabric is measured and taken as water absorption speed (sec).

After the water drops are completely absorbed into the test sample, the section of a portion where the water drops permeate is observed by the VH-8000 digital microscope of Keyence Co., Ltd. to measure the layer of the portion where water drops permeate. The average value of 10 measurement data is taken as the thickness of the hydrophilic layer.

(7) Water Absorption Height

The abrasive ground fabric is cut to a width of 25 mm and a length of 250 mm to prepare a test sample, and the obtained test sample is left in a desiccator maintained at a temperature of 20° C. and a humidity of 60% for 12 hours or more. A beaker is filled with pure water to a depth of 5 cm or more, and the test sample is fixed vertically so that a 20 mm end portion of the test sample is immersed in water. After 1 hour or 10 minutes, the height of water sucked up by a capillary phenomenon is measured on the front side and the rear side. The average value of the measurement data of three test samples is evaluated.

(8) Measurement of Silicon Content

This is measured by the 3080E fluorescent X-ray analyzer of Rigaku Denki Co., Ltd. 100 g of the abrasive ground fabric is weighed accurately and used as a measurement sample. The content of silicon in the measurement sample is expressed by weight fraction (ppm).

(9) Surface Average Roughness (Ra), Peak Value (Rp) and Valley Value (Rv) of Magnetic Recording Substrate These are calculated based on a chart obtained by measuring a magnetic recording substrate after texturing by a surface roughness meter (TMS-2000 of Veeco Instrument Inc.) in accordance with JIS-B0601. That is, when the measured surface roughness is expressed by a function F (x) for a section from 0 to L of the measurement length direction x, it can be calculated from the following expression (1).

In the expression (1), <F(x)> is the average value of function F (x) (x=0 to L).

$$Ra = \frac{1}{L}\int_0^L |F(x) - \langle F(x) \rangle| \, dx$$

Rp and Rv are differences between the average value of surface roughness and the peak portion and between the average value of surface roughness and the valley portion, respectively, and are expression by the following equations.

Rp=highest peak portion−average value

Rv=lowest valley portion−average value

Example 1

49.1 parts of polyethylene having a melt index measured at 260° C. of 90, 50 parts of nylon 6 having a melt index of 18 and 0.9 part of polyethylene glycol were mixed together in the form of chips. Then, the obtained mixture of chips was supplied to an extruder and spun. The temperatures of the melting section and the end of the screw were 260° C., the temperatures of the spinning pack and the spinning nozzle were 250° C., and the diameter of the spinning nozzle was 0.3 mm. Further, the mixed spun fibers were drawn, mechanically twisted and then cut. The obtained mixed spun fibers (parent yarn) were fiber bundles having a fineness of 6.6 dtex and a length of 51 mm. The fiber bundles were let pass through a card to prepare a web which was then punched with a needle to prepare an intertwined fiber web. This web was let pass through a 140° C. heating zone and pressed with a calender roll to obtain a fiber substrate having a weight of 670 g/m² and a thickness of 1.9 mm.

Meanwhile, a mixture of polytetramethylene glycol/polybutylene adipate (molecular weight of 2,000, 60/40) was reacted with diphenylmethane diisocyanate and ethylene glycol to obtain a polyurethane resin (elastic polymer) having a 100% elongation modulus of 10.8 MPa. To this polyurethane resin were added a coagulation modifier and dimethyl formamide (DMF) to prepare an impregnation solution having a solid content of 15%.

The above fiber substrate was immersed in this impregnation solution having a polyurethane content of 15 wt %, squeezed with nip rollers and wet coagulated in water, and then the solvent was removed from the fiber substrate. The obtained fiber substrate was dried with hot air to obtain substrate impregnated with polyurethane which was a composite material comprising the fiber substrate and the elastic polymer filled in the gaps of the substrate. This polymer elastic was a porous material. This fiber substrate was immersed in toluene heated at 85° C. and nipped repeatedly to dissolve and remove polyethylene which was a sea component in the fiber so as to obtain fine fibers. In the obtained fine fiber substrate impregnated with polyurethane, the ratio (R/F) of the polyurethane resin as the elastic polymer to the fibers was 35/65. The original mixed spun fiber (parent yarn) was a fiber bundle of nylon fine fibers alone, the average diameter on the cross section of the fine fibers of the fiber bundle in the center portion measured by the method described above was 1.10 μm, the average diameter of the fine fibers in the peripheral portion was 0.31 μm, and the number of fine fibers of the fiber bundle was about 650.

DMF was applied to the front and rear sides of the obtained fine fiber substrate impregnated with polyurethane by a gravure roll in an amount of about 5 g/m² and dried. The elastic polymer was existent in spaces between fiber bundles of fine fibers on the treated surfaces. This elastic polymer was polyurethane re-dissolved in DMF. Thereafter, the both sides were polished with a polishing machine provided with 320-mesh sand paper to raise them, and the substrate was sliced to ½ of the thickness to prepare a 0.65 mm-thick raised ground fabric.

The stress at the time of 20% elongation of the abrasive ground fabric comprising this ground fabric was 27.1 N/cm, the tensile strength thereof was 87.6 N/cm, the reduction in the width of the center portion when this abrasive ground fabric having a width of 4.0 cm was pulled under a load of 20 N was 2.0 mm, and the abrasive ground fabric had no rough surface and could fully stand tension while in use.

The obtained abrasive ground fabric was slit to a width of 4.0 cm and used for the texturing of an aluminum hard disk as a magnetic recording substrate. The abrasive contained 0.1 μm polycrystal diamond abrasive grains and an anionic dispersant. The surface average roughness Ra of the hard disk was satisfactory at 3.5 Å.

The physical properties of the obtained abrasive ground fabric and magnetic recording substrate are shown in Table 1.

Comparative Example 1

Polyethylene having a melt index measured at 260° C. of 90 was used as a sea component of a composite fiber, nylon 6 having a melt index of 18 was used as an island component of the composite fiber, and they were spun under conditions that the fineness of the island component was 0.056 dtex, the number of islands was 38 and the polyethylene (sea component)/nylon 6 (island component) ratio was 40:60 to obtain a composite fiber having a fineness of 5.3 dtex and a length of 51 mm. An abrasive ground fabric was manufactured in the same manner as in Example 1 except that this composite fiber was used in place of the mixed spun fiber of Example 1. The diameters of the fine fibers of the peripheral portion and the fine fibers of the center portion of each staple of the obtained abrasive ground fabric were both 2.4 μm.

Texturing was carried out in the same manner as in Example 1. The surface average roughness Ra of the textured disk was 18 Å. The same uniform surface as in Example 1 was not obtained. The physical properties of the obtained abrasive ground fabric and magnetic recording substrate are shown in Table 1.

Example 2

An abrasive ground fabric was manufactured in the same manner as in Example 1 except that an impregnation solution having a solid content of 5% was used in place of the polyurethane resin impregnation solution having a solid content of 15% used in Example 1. The ratio of the elastic polymer (polyurethane resin) to the fiber substrate of this abrasive ground fabric was 5/95.

This abrasive ground fabric was composed of fine fibers like as those obtained from Example 1. However, the fine fibers had longer hairs than those of Example 1, were slightly inferior in surface uniformity and had a thickness variation of 3.8 and a tensile strength of 8 N/cm.

When texturing was carried out in the same manner as in Example 1, the number of scratches was small. The physical properties of the obtained abrasive ground fabric and magnetic recording substrate are shown in Table 1.

Comparative Example 2

50 parts of polyethylene and 50 parts of polyethylene terephthalate were mixed together in the form of chips. Then, the obtained mixture of chips was supplied to an extruder and spun. The temperatures of the melting section and the end of the screw were 290° C., the temperatures of the spinning pack and the spinning nozzle were 285° C., and the diameter of the spinning nozzle was 0.3 mm. Further, the mixed spun fibers were drawn, mechanically twisted and then cut to prepare bundles having a fineness of parent yarn of the mixed spun fibers of 6.6 dtex. Thereafter, the bundles were let pass through a card to prepare webs which were then punched with a needle to obtain a fiber substrate having a weight of 670 g/m².

This fiber substrate was impregnated with a polyurethane resin to form fine fibers and raised to prepare an abrasive ground fabric in the same manner of Example 1. The diameters of the fine fibers of the center portion and the fine fibers of the peripheral portion of each fiber bundle in the obtained ground fabric were 0.32 μm and 0.23 μm, respectively. The abrasive ground fabric had a tensile strength of 25 N/cm, the reduction in width of 8.5 mm and a thickness variation of 4.0%. Thus, the abrasive ground fabric had low strength and a roughened surface.

When texturing was carried out with this abrasive ground fabric in the same manner as in Example 1, many scratches were observed and the surface average roughness Ra of the disk was 10 Å. Thus, the same uniform surface as in Example 1 was not obtained. The physical properties of the obtained abrasive ground fabric and magnetic recording substrate are shown in Table 1.

Example 3

A non-raised abrasive ground fabric was manufactured in the same manner as in Example 1 except that polishing with sand paper was not carried out.

The obtained abrasive ground fabric was used for texturing like Example 1. The surface average roughness Ra of the hard disk was 4.0 Å.

The physical properties of the obtained abrasive ground fabric and magnetic recording substrate are shown in Table 2.

Example 4

A raised ground fabric was manufactured in the same manner as in Example 1. Thereafter, the raised ground fabric was dipped in a 1% aqueous solution of sodium dioctylsulfosuccinate as an anionic penetrant and nipped to a squeeze ratio of 70%. Thereafter, the ground fabric was dried with hot air at 120° C. for 5 minutes to obtain an abrasive ground fabric.

The water absorption speed of the treated abrasive ground fabric was 5 seconds.

Texturing was carried out with this abrasive ground fabric treated with this anionic penetrant in the same manner as in Example 1. The penetration speed into the abrasive ground fabric of the abrasive was higher than in Example 1, the abrasive ground fabric had no defect such as a scratch, and the surface average roughness Ra of the textured hard disk was 3.1 Å.

The physical properties of the obtained abrasive ground fabric and magnetic recording substrate are shown in Table 2.

Example 5

An abrasive ground fabric was manufactured in the same manner as in Example 1 except that the 100% elongation modulus of the polyurethane resin (elastic polymer) was 27.5 MPa in stead of 10.5 MPa.

The obtained abrasive ground fabric was used for texturing like Example 1. The surface average roughness Ra of the hard disk was 3.8 Å. The physical properties of the obtained abrasive ground fabric and magnetic recording substrate are shown in Table 2.

Example 6

A polyurethane impregnated fine fiber substrate was obtained in the same manner as in Example 1.

DMF was applied to the front and rear sides of the obtained fiber substrate to a weight of about 5 g/m² by a gravure roll and dried. This fiber substrate was immersed in a 1% aqueous solution of Silcoat FZS (amino modified silicone having a solid content of 20% of Matsumoto Yushi Seiyaku Co., Ltd.) to a wet pick-up of 70%, squeezed with a mangle and dried. Thereafter, the both sides were polished two times respectively with a polisher provided with 400-mesh sand paper to be raised, and the fiber substrate was sliced to produce a 0.8 mm-thick raised ground fabric.

The obtained raised ground fabric was dipped in the F-90C fluroresin (of Dainippon Ink and Chemicals, INC.), nipped with a clearance which was 70% of the thickness and dried to make the whole ground fabric water repellent. The deposition of solid matter contained in the F-90 based on the ground fabric was 0.5%. The water repellency of the ground fabric was 100 points in a JIS-K6328 water repellency test. A 5% methanol solution of sodium dioctylsulfosuccinate was applied to the surface of the water repellent ground fabric by a 70-mesh gravure roll and dried. This treatment was repeated twice to obtain an abrasive ground fabric having a hydrophilic surface. The tensile strength of the ground fabric was 86.7 N/cm, the reduction in the width of the center portion of a 4.0 cm-wide abrasive ground fabric when it was pulled under a load of 20 N was 2.1 mm, and the abrasive ground fabric had no rough surface and could fully stand tension while in use. The water absorption height of the abrasive ground fabric after 10 minutes was 2.6 cm on the front side and 0.0 cm on the rear side, and the water absorption height after 1 hour was 5.0 cm on the front side and 0.0 cm on the rear side. That is, water was absorbed gradually along the passage of time. The thickness of the hydrophilic layer on the front side was 315 μm. The content of silicon was 3,150 ppm.

Texturing was carried out with the obtained abrasive ground fabric in the same manner as in Example 1. The penetration speed into the ground fabric of the abrasive was optimum, and the abrasive ground fabric had no defect such as a scratch. After texturing, Rp<Rv when Rv/Rp was 4.0 and Ra was 3.2 Å.

The physical properties of the obtained abrasive ground fabric and magnetic recording substrate are shown in Table 3.

Example 7

A raised ground fabric was manufactured in the same manner as in Example 6. The obtained raised ground fabric was washed in a solution containing 4 g/l of the SSK-4 (trade name) (polyoxyethylene alkyl ether) of Matsumoto Yushi Seiyaku Co., Ltd. and 2 g/l of sodium hydroxide at a bath ratio of 40:1 by a jet dyeing machine at 60° C. for 40 minutes.

Thereafter, the obtained raised ground fabric was wholly made water repellent and the surface thereof was made hydrophilic in the same manner as in Example 6 to obtain an abrasive ground fabric. The tensile strength of the ground fabric was 86.7 N/cm, the reduction in the width of the center portion of a 4.0 cm-wide abrasive ground fabric when it was pulled under a load of 20 N was 2.1 mm, and the abrasive ground fabric had no rough surface and could fully stand tension while in use. The water absorption height of the abrasive ground fabric after 10 minutes was 2.4 cm on the front side and 0.0 cm on the rear side, and the water absorption height after 1 hour was 5.0 cm on the front side and 0.0 cm on the rear side. That is, water was absorbed gradually along the passage of time. The thickness of the hydrophilic layer on the front side was 315 μm. The content of silicon was 30 ppm, much lower than 3,150 ppm of Example 6, due to the washing effect.

Texturing was carried out with the obtained abrasive ground fabric in the same manner as in Example 1. The penetration speed in the ground fabric of the abrasive was optimum, the abrasive ground fabric had no defect such as a scratch, Rp<Rv when Rv/Rp of a hard disk was 4.0, and Ra was 3.2 Å. Thereafter, a hard disk having a magnetic layer on the front side was obtained. The obtained hard disk was satisfactory without a floating magnetic layer.

The physical properties of the obtained abrasive ground fabric and magnetic recording medium are shown in Table 3.

Example 8

A non-raised abrasive ground fabric was manufactured in the same manner as in Example 6 except that polishing with sand paper was not carried out. The water absorption height of the abrasive ground fabric after 10 minutes was 2.0 cm on the front side and 0.0 cm on the rear side, and the water absorption height after 1 hour was 4.8 cm on the front side and 0.0 cm on the rear side. That is, water was absorbed gradually along the passage of time. The thickness of the hydrophilic layer on the front side was 320 μm.

The obtained abrasive ground fabric was used for texturing like Example 1. Although the number of scratches was apt to increase slightly, Rp<Rv when Rv/Rp of a hard disk was 3.5, and Ra was 1.9 Å.

The physical properties of the obtained abrasive ground fabric and magnetic recording substrate are shown in Table 3.

Comparative Example 3

Polyethylene having a melt index measured at 260° C. of 90 was used as a sea component of a composite fiber, nylon 6 having a melt index of 18 was used as an island component of the composite fiber, and they were spun under conditions that the fineness of the island component was 0.056 dtex, the number of island was 38 and the polyethylene (sea component)/nylon 6 (island component) ratio was 40:60 to obtain a composite fiber having a fineness of 5.3 dtex and a length of 51 mm. An abrasive ground fabric was manufactured in the same manner as in Example 6 except that this composite fiber was used in place of the mixed spun fiber of Example 6. The diameters of the fine fibers of the peripheral portion and the fine fibers of the center portion of each fiber bundle of the obtained abrasive ground fabric were both 2.4 μm. The water absorption height of the abrasive ground fabric was 4.0 cm on the front side and 0.0 cm on the rear side.

Texturing was carried out in the same manner as in Example 1. The surface average roughness Ra of the textured disk was 9.5 Å. The same uniform surface as in Example 1 and Example 6 was not obtained. The physical properties of the obtained abrasive ground fabric and magnetic recording substrate are shown in Table 4.

Example 9

An abrasive ground fabric was obtained in the same manner as in Example 6 except that an impregnation solution having a solid content of 5% was used in place of the impregnation solution of a polyurethane resin having a solid content of 15% in Example 6 according to Example 1. The ratio of the polyurethane resin as a elastic polymer to the fiber substrate of the abrasive ground fabric was 5/95.

The abrasive ground fabric was composed of fine fibers as in Example 6. However, since the amount of the elastic polymer was small, the surface state could not be maintained, and the length of hair was longer, the surface uniformity was worse and the thickness variations were larger than in Example 6.

Texturing was carried out in the same manner as in Example 1 but the abrasive ground fabric absorbed water at the time of processing and was apt to elongate. The physical properties of the obtained abrasive ground fabric and magnetic recording substrate are shown in Table 4.

Example 10

An abrasive ground fabric was manufactured in the same manner as in Example 6 except that an impregnation solution having a solid content of 30% was used in place of the impregnation solution of a polyurethane resin having a solid content of 15% in Example 6 according to Example 1. The ratio of the polyurethane resin as a elastic polymer to the fiber substrate of the abrasive ground fabric was 70/30. The water absorption height of this abrasive ground fabric was 4.0 cm on the front side and 0.0 cm on the rear side.

Texturing was carried out in the same manner as in Example 1. The amount of polyurethane exposed to the surface was large and a small number of scratches were observed. However, Rp<Rv when Rv/Rp of a textured disk was 2.4 and the surface average roughness Ra was 4.5 Å.

TABLE 1

|  | Ex. 1 | C. Ex. 1 | Ex. 2 | C. Ex. 2 |
|---|---|---|---|---|
| Thickness of abrasive ground fabric (mm) | 0.65 | 0.65 | 0.5 | 0.65 |
| CV of thickness (%) | 2 | 2 | 3.8 | 4 |
| Fine fibers of each fiber bundle |  |  |  |  |
| Center portion D1 (μm) | 1.1 | 2.4 | 1.1 | 0.32 |
| Peripheral portion D2 (μm) | 0.31 | 2.4 | 0.31 | 0.23 |
| D1/D2 | 3.5 | 1 | 3.5 | 1.4 |
| largest diameter (μm) | 4.3 | 2.4 | 4.3 | 0.41 |
| smallest diameter (μm) | 0.05 | 2.4 | 0.05 | 0.05 |
| Number of fine fibers (μm) | 650 | 38 | 650 | 2500 |
| Total fineness (per fiber bundle) (dtex) | 3.3 | 2.1 | 3.3 | 3.3 |
| elastic polymer |  |  |  |  |
| 100% elongation modulus (MPa) | 10.5 | 10.5 | 10.5 | 10.5 |
| elastic polymer/fiber (R/F) | 35/65 | 35/65 | 5/95 | 35/65 |

TABLE 1-continued

|  | Ex. 1 | C. Ex. 1 | Ex. 2 | C. Ex. 2 |
|---|---|---|---|---|
| tensile strength (N/cm) | 87.6 | 120 | 8 | 25 |
| reduction in width (%) | 5.0 | 0.5 | 10 | 8.5 |
| water absorption speed (min) | 25 | 25 | 10 | 5 |
| water absorption height (1 hr) front side (cm) | 18.4 | 17.6 | 17.3 | 14.3 |
| rear side (cm) | 17.5 | 16.3 | 18.4 | 15.3 |
| result of texturing |  |  |  |  |
| Ra (Å) | 3.5 | 18 | 12 | 10 |
| Rv/Rp | 1.2 | 1.2 | 1 | 1.1 |

Ex.: Example

TABLE 2

|  | Ex. 3 | Ex. 4 | Ex. 5 |
|---|---|---|---|
| Thickness of abrasive ground fabric (mm) | 0.7 | 0.65 | 0.65 |
| CV of thickness (%) | 1.8 | 2 | 2 |
| 100% elongation modulus of elastic polymer (MPa) | 10.5 | 10.5 | 27.5 |
| elastic polymer/fiber (R/F) | 35/65 | 35/65 | 35/65 |
| tensile strength (N/cm) | 87.6 | 87.6 | 131.4 |
| reduction in width (%) | 5.0 | 5.0 | 1.3 |
| water absorption speed (min) | 25 | 5 | 25 |
| water absorption height (1 hr) front side (cm) | 18.5 | 20 | 16.5 |
| rear side (cm) | 17.3 | 19.5 | 17.5 |
| raising | not raised | raised | raised |
| result of texturing |  |  |  |
| Ra (Å) | 4 | 3.1 | 3.8 |
| Rv/Rp | 1.1 | 0.95 | 0.85 |

Ex.: Example

TABLE 3

|  | Ex. 6 | Ex. 7 | Ex. 8 |
|---|---|---|---|
| Thickness of abrasive ground fabric (mm) | 0.8 | 0.8 | 0.8 |
| CV of thickness (%) | 2.2 | 2.0 | 2.3 |
| 100% elongation modulus of elastic polymer (MPa) | 10.5 | 10.5 | 10.5 |
| elastic polymer/fiber (R/F) | 35/65 | 35/65 | 35/65 |
| tensile strength (N/cm) | 86.7 | 78.3 | 88.5 |
| reduction in width (%) | 5.3 | 5.0 | 5.8 |
| water absorption speed (min) | 45 | 45 | 53 |
| water absorption thickness (μm) | 315 | 315 | 320 |
| water absorption height (1 hr) front side (cm) | 5.0 | 5.0 | 4.8 |
| rear side (cm) | 0.0 | 0.0 | 0.0 |
| raising | raised | raised | not raised |
| result of texturing |  |  |  |
| Ra (Å) | 3.2 | 3.2 | 1.9 |
| Rv/Rp | 4.0 | 4.0 | 3.5 |

Ex.: Example

TABLE 4

|  | C. Ex. 3 | Ex. 9 | Ex. 10 |
|---|---|---|---|
| Thickness of abrasive ground fabric (mm) | 0.8 | 0.8 | 0.8 |
| CV of thickness (%) | 2.3 | 3.8 | 2.0 |
| Fine fibers of each fiber bundle |  |  |  |
| Center portion D1 (μm) | 2.4 | 1.1 | 1.1 |
| Peripheral portion D2 (μm) | 2.4 | 0.31 | 0.31 |
| D1/D2 | 1 | 3.5 | 3.5 |
| largest diameter (μm) | 2.4 | 4.3 | 4.3 |
| smallest diameter (μm) | 2.4 | 0.05 | 0.05 |
| Number of fine fibers | 38 | 650 | 650 |
| Total fineness (per fiber bundle) (dtex) | 2.1 | 3.3 | 3.3 |

TABLE 4-continued

| | C. Ex. 3 | Ex. 9 | Ex. 10 |
|---|---|---|---|
| elastic polymer | | | |
| 100% elongation modulus (MPa) | 10.5 | 10.5 | 10.5 |
| elastic polymer/fiber (R/F) | 35/65 | 5/95 | 70/30 |
| tensile strength (N/cm) | 126.5 | 8.0 | 88.1 |
| reduction in width (%) | 3.8 | 25 | 5.0 |
| water absorption speed (min) | 95 | 50 | 58 |
| water absorption height (1 hr) front side (cm) | 4.0 | 5.0 | 4.0 |
| rear side (cm) | 0.0 | 0.0 | 0.0 |
| result of texturing | | | |
| Ra (Å) | | 9.5 | 12 | 4.5 |
| Rv/Rp | | 3.5 | 1.0 | 2.4 |

Ex.: Example

What is claimed is:

1. An abrasive ground fabric which is a composite ground fabric comprising a fiber substrate and a elastic polymer filled in the fiber substrate, wherein
   (1) the fiber substrate is composed of bundles, each consisting of 20 to 3,000 fine fibers, and (2) the average diameter (D1) of fine fibers existent in a center portion from the center of the cross section perpendicular to a lengthwise direction of each bundle to ½ of the radius of each fiber bundle is 0.3 to 10 $\mu$m, the average diameter (D2) of fine fibers existent in a peripheral portion from ½ of the radius to the end of each fiber bundle is 0.05 to 1 $\mu$m, and the D1/D2 ratio is 1.5 or more.

2. The abrasive ground fabric of claim 1 which has a elastic polymer/fiber substrate weight ratio of 10/90 to 60/40.

3. The abrasive ground fabric of claim 1, wherein the elastic polymer is existent substantially in spaces between fiber bundles constituting the fiber substrate.

4. The abrasive ground fabric of claim 1, wherein the fiber substrate is composed of fiber bundles, each consisting of 50 to 2,000 fine fibers.

5. The abrasive ground fabric of claim 1, wherein the average diameter (D1) of fine fibers existent in the center portion of each bundle is 0.5 to 2 $\mu$m and the average diameter of (D2) of fine fibers existent in the peripheral portion of each bundle is 0.1 to 0.7 $\mu$m.

6. The abrasive ground fabric of claim 1, wherein the fiber substrate is a nonwoven structure composed of the fiber bundles.

7. The abrasive ground fabric of claim 1, wherein the elastic polymer has a 100% elongation modulus of 9 to 40 MPa.

8. The abrasive ground fabric of claim 1, wherein each of the fiber bundles consists of fine fibers formed from a polyamide.

9. The abrasive ground fabric of claim 1 which has a thickness of 0.3 to 1.2 mm and a thickness standard deviation value (CV) of 3 or less.

10. The abrasive ground fabric of claim 1 which has a tape shape and has a width of 5 to 300 mm.

11. The abrasive ground fabric of claim 1 which has a tensile strength of 10 N/cm or more.

12. The abrasive ground fabric of claim 1 which has a tape shape and has a reduction in width under a load of 5 N/cm of 20% or less.

13. The abrasive ground fabric of claim 1 which has a water absorption speed on at least one side of 80 seconds or less.

14. The abrasive ground fabric of claim 1 which has a hydrophilic layer having a thickness of 500 $\mu$m or less on one side.

15. The abrasive ground fabric of claim 1 which has a water absorption height on one side of 20 mm/hr or more and a water absorption height on the side opposite to the one side of 5 mm/hr or less.

16. The abrasive ground fabric of claim 1 which has one raised side.

17. A process for polishing a magnetic recording substrate, comprising polishing the surface of the magnetic recording substrate with the abrasive ground fabric of claim 1 while supplying a slurry containing at least one type of abrasive grains selected from the group consisting of aluminum oxide, silicon dioxide, cerium oxide, zirconium oxide, silicon nitride, monocrystal diamond and polycrystal diamond and said abrasive grains having a diameter of 0.05 to 0.5 $\mu$m to the surface of the magnetic recording substrate.

18. An abrasive ground fabric which is a composite ground fabric comprising a fiber substrate and a elastic polymer filled in the fiber substrate, wherein (1) the fiber substrate is composed of bundles, each consisting of 20 to 3,000 fine fibers, (2) the average diameter (D1) of fine fibers existent in a center portion from the center of the cross section perpendicular to a lengthwise direction of each bundle to ½ of the radius of each bundle is 0.3 to 10 $\mu$m, the average diameter (D2) of fine fibers existent in a peripheral portion from ½ of the radius to the end of each bundle is 0.05 to 1 $\mu$m, and the D1/D2 ratio is 1.5 or more,
   and the abrasive ground fabric has (a) a water absorption height on one side of 20 mm/hr or more and a water absorption height on the side opposite to the one side of 5 mm/hr or less, and (b) one raised side.

* * * * *